Jan. 1, 1952     F. PUTTRE     2,581,140
MEAT MARKET
Filed March 8, 1947
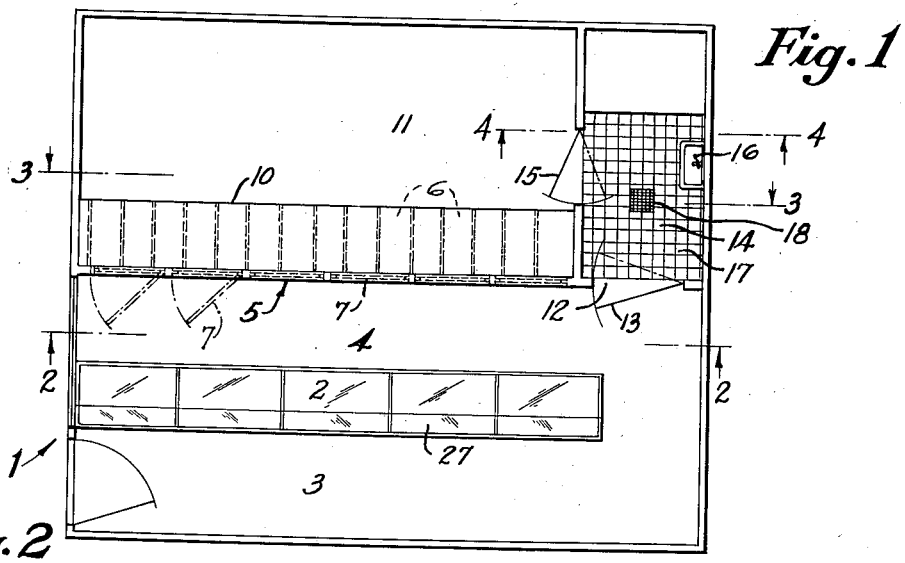
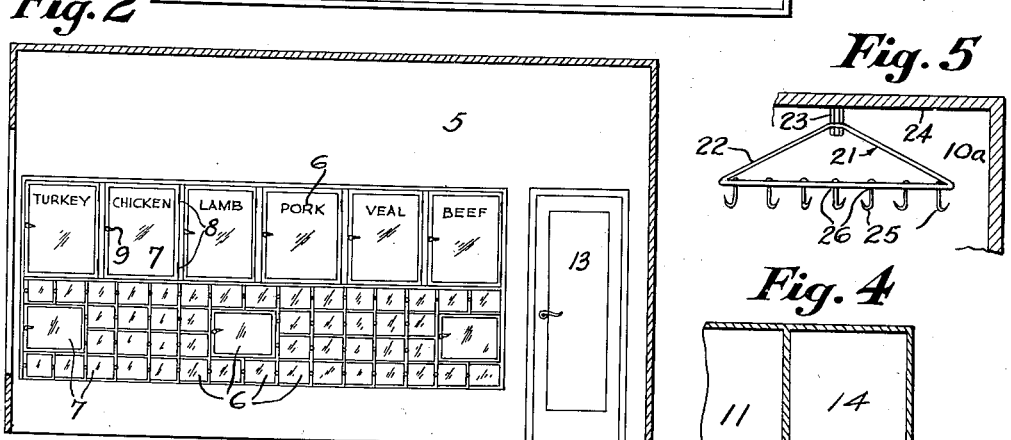
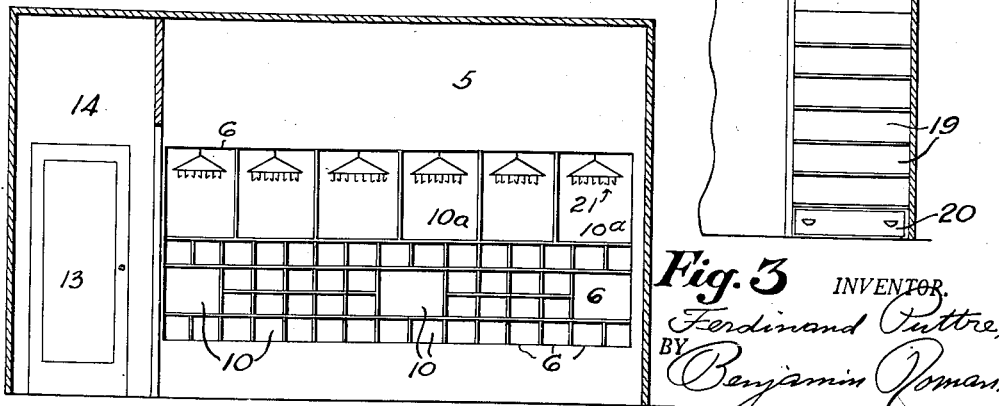
INVENTOR.
Ferdinand Puttre,
BY Benjamin Roman,
Atty.

Patented Jan. 1, 1952

2,581,140

UNITED STATES PATENT OFFICE 2,581,140

MEAT MARKET

Ferdinand Puttre, Brooklyn, N. Y.

Application March 8, 1947, Serial No. 733,397

1 Claim. (Cl. 20—1.6)

This invention relates to a meat market. Various disadvantages and objectionable conditions have been heretofore inherent in the operation of a meat store, in that the meats are kept in an ice box to which access is often inconvenient for the several workers who are both handlers as well as sellers of the meats. Due to this circumstance meats often become unduly exposed about the store and there is produced soiling and marring of the premises and of the workers' garments. There are often also caused uncleanliness, unsightliness, unsanitariness, and other undesirable conditions well known to those versed in this art.

The principal object of the invention is to provide an improved meat market which will remedy all of the aforesaid and other disadvantages, and wherein the handling and selling of the meats may be performed separately by specialized workers, thereby resulting in merchandising which requires less labor, is more expeditious, and more economical.

Another object of the invention is to provide an improved meat market, which, besides carrying out the aforesaid and other objects and advantages, will be inherently more attractive and inviting to customers and therefore productive of enhanced trade and profits.

Other objects and advantages will hereinafter appear.

In the accompanying drawings,

Fig. 1 is a plan view of the meat market constituting the invention.

Fig. 2 is an elevational view of the meat market, taken on line 2—2 of Fig. 1.

Fig. 3 is an elevational view of the meat market, taken on line 3—3 of Fig. 1.

Fig. 4 is a fragmentary cross-sectional elevational view showing a portion of the meat market, taken on line 4—4 of Fig. 1.

Fig. 5 is an elevational view, in an enlarged scale, showing a detail of the invention.

The meat market 1 includes a usual serving counter 2, in front of which is a customers' floor area 3 and therebeyond an area 4 for the store clerks. Rearwardly of the area 4 is provided a wall 5, into which is built a plurality of lockers 6 in the manner illustrated in Fig. 2, each locker being provided with a door 7 mounted on hinges 8 and having a handle 9 for opening and closing the door. Each locker 6 is open at its rear 10, as shown in Fig. 3, and beyond the wall 5 with its lockers 6 is a room 11, Fig. 1, which is maintained in a refrigerated condition by any suitable means for cooling the locker spaces. The room 11 is for occupancy of meat handlers as well as for storage and rentention of the meat stocks of the establishment in requisitely cooled condition. The wall 5, Figs. 1, 2, is preferably provided with a doorway 12 and door 13 leading into a room 14 which is organized for the efficient handling and maintenance of fish goods, this room being preferably connected with the room 11 by a door 15 and cooled by the refrigeration from the room 11. As herein illustrated, the room 14 is equipped with water service 16, a special flooring 17 with a drain 18, and a series of shelving and drawers 19, 20, as shown in Fig. 4.

In each of the larger locker bins 10a, Figs. 3, 5, is preferably installed a meat suspender 21, comprising a framing 22 pivotally mounted at 23 to the ceiling 24, and said framing carrying a plurality of meat hooks 25 pivotally mounted thereto at 26. Each of the doors 7 is preferably labeled as illustrated to denote the contents of its bin or locker 6.

In the operation of the market the workers in room 11 stow the meats in each of the lockers 6, and the clerks in area 4 obtain the meats through the doors 7 for dressing the showcase 27 of counter 2 and for serving the customers in area 3, the meat handlers in the room 11 continually replenishing the lockers 6 for this purpose. By resorting to the device 21, Figs. 3, 5, the worker in room 11 may suspend the meats upon its hooks 25 and then turn the device about its pivot 23 to dispose it with its hooks facing the door 7 for the convenient removal of the meats therefrom by the clerk in area 4. The clerk may conveniently obtain the already prepared fish goods from the room 14 for supplying the showcase 27 and serving the customers.

It will be evident from the foregoing that with this meat market all of the above mentioned as well as many other valuable objects and advantages of the invention are fully attained.

Variations may be resorted to within the scope of the invention, and portions of the improvements may be used without others.

Having thus described my invention, I claim:

A meat market having the combination of a customers' counter, and a floor area therebeyond for customers' clerks, of a closed wall beyond said area constituting the rear wall of the market, said wall having therein a plurality of lockers for and corresponding to the various saleable meats, each of said lockers being open at the rear thereof and provided with a closable door at the front thereof, said wall constituting a front wall of a refrigerated room therebeyond for maintaining said lockers in cooled state through their said open doors and accommodating meat handlers for supplying meats into said lockers through their said open rears, said meats being available to said clerks for sale on said counter by access through said doors, and certain of said lockers having mounted therein a suspender for meats and others of said lockers being smaller to contain small cuts of meats.

FERDINAND PUTTRE.

REFERENCES CITED

The following references are of record in the file of this patent:

UNITED STATES PATENTS

| Number | Name | Date |
|---|---|---|
| 854,805 | Crawford | May 28, 1907 |
| 1,345,481 | Davis | July 6, 1920 |
| 1,859,270 | McKee et al. | May 17, 1932 |

FOREIGN PATENTS

| Number | Country | Date |
|---|---|---|
| 116,737 | Australia | Apr. 8, 1943 |
| 759,151 | France | 1933 |